(12) United States Patent
Lee et al.

(10) Patent No.: US 11,996,603 B2
(45) Date of Patent: May 28, 2024

(54) SELF-ALIGNING MAGNETIC ANTENNA FEED CONNECTION

(71) Applicant: Microsoft Technology Licensing, LLC, Redmond, WA (US)

(72) Inventors: Jaejin Lee, Beaverton, OR (US); Marc Harper, Snohomish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 78 days.

(21) Appl. No.: 17/748,135

(22) Filed: May 19, 2022

(65) Prior Publication Data

US 2023/0378631 A1  Nov. 23, 2023

(51) Int. Cl.
| | | |
|---|---|---|
| *H01Q 1/28* | (2006.01) | |
| *H01Q 1/12* | (2006.01) | |
| *H01Q 1/24* | (2006.01) | |
| *H01Q 9/04* | (2006.01) | |
| *H01Q 21/28* | (2006.01) | |

(52) U.S. Cl.
CPC .......... *H01Q 1/1207* (2013.01); *H01Q 1/241* (2013.01); *H01Q 9/0414* (2013.01); *H01Q 21/28* (2013.01)

(58) Field of Classification Search
CPC .... H01Q 1/1207; H01Q 1/241; H01Q 9/0414; H01Q 21/28
See application file for complete search history.

(56) References Cited

U.S. PATENT DOCUMENTS

| | | |
|---|---|---|
| 8,106,844 B2 | 1/2012 | Tsujimura et al. |
| 9,112,303 B2 | 8/2015 | Zeliff et al. |

(Continued)

FOREIGN PATENT DOCUMENTS

| | | |
|---|---|---|
| CN | 102163862 B | 8/2016 |

OTHER PUBLICATIONS

Seong, et al., "A Study on Precise Positioning for an Electric Vehicle Wireless Power Transfer System Using a Ferrite Antenna", In Journal of Electronics, vol. 9, Issue 8, Aug. 11, 2020, 27 Pages.

(Continued)

*Primary Examiner* — Graham P Smith
(74) *Attorney, Agent, or Firm* — Holzer Patel Drennan

(57) ABSTRACT

An electronic communication device communicates a radiofrequency communication signal between wireless communication circuitry and an antenna structure. The antenna structure may be mounted on a first component support structure and configured to communicate wireless radiofrequency signals. A first connector may be connected to the antenna structure. A second component support structure may be mechanically coupled to the first component support structure and capable of movement with respect to the first component support structure. Wireless communication circuitry may be mounted on the second component support structure configured to communicate with the antenna structure using radiofrequency carrier signals. A second connector may be connected to the wireless communication circuitry. The first connector and the second connector may be mechanically connected and resiliently aligned by magnetic attraction therebetween and communicatively coupled to communicate the radiofrequency carrier signal between the wireless communication circuitry and the antenna structure.

20 Claims, 9 Drawing Sheets

(56) References Cited

U.S. PATENT DOCUMENTS

| | | |
|---|---|---|
| 9,197,011 B2 | 11/2015 | Mccormack |
| 10,186,756 B2 | 1/2019 | Dalmia |
| 2007/0254510 A1 | 11/2007 | Debey |
| 2017/0257147 A1* | 9/2017 | Szeto .................. H04B 5/0037 |

OTHER PUBLICATIONS

"International Search Report and Written Opinion Issued in PCT Application No. PCT/US23/013395", dated Jun. 9, 2023, 12 Pages.

* cited by examiner

SELF-ALIGNING MAGNETIC ANTENNA FEED CONNECTION

BACKGROUND

Many electronic devices today utilize some form of wireless technology to transmit and receive information. Such devices typically include one or more antennas that enable wireless signals to be transmitted and received. The antennas are communicatively coupled to transceivers that supply the wireless signals to the antennas.

SUMMARY

In an example implementation, an electronic communication device communicates a radiofrequency communication signal between wireless communication circuitry and an antenna structure. The antenna structure may be mounted on a first component support structure and configured to communicate wireless radiofrequency signals. A first connector may be connected to the antenna structure. A second component support structure may be mechanically coupled to the first component support structure and capable of movement with respect to the first component support structure. Wireless communication circuitry may be mounted on the second component support structure configured to communicate with the antenna structure using radiofrequency carrier signals. A second connector may be connected to the wireless communication circuitry. The first connector and the second connector may be mechanically connected and resiliently aligned by magnetic attraction therebetween and communicatively coupled to communicate the radiofrequency carrier signal between the wireless communication circuitry and the antenna structure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The disclosure will be readily understood by the following detailed description in conjunction with the accompanying drawings.

The use of cross-hatching or shading in the accompanying figures is generally provided to clarify the boundaries between adjacent elements, e.g., when shown in cross section, and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

Figure 1:
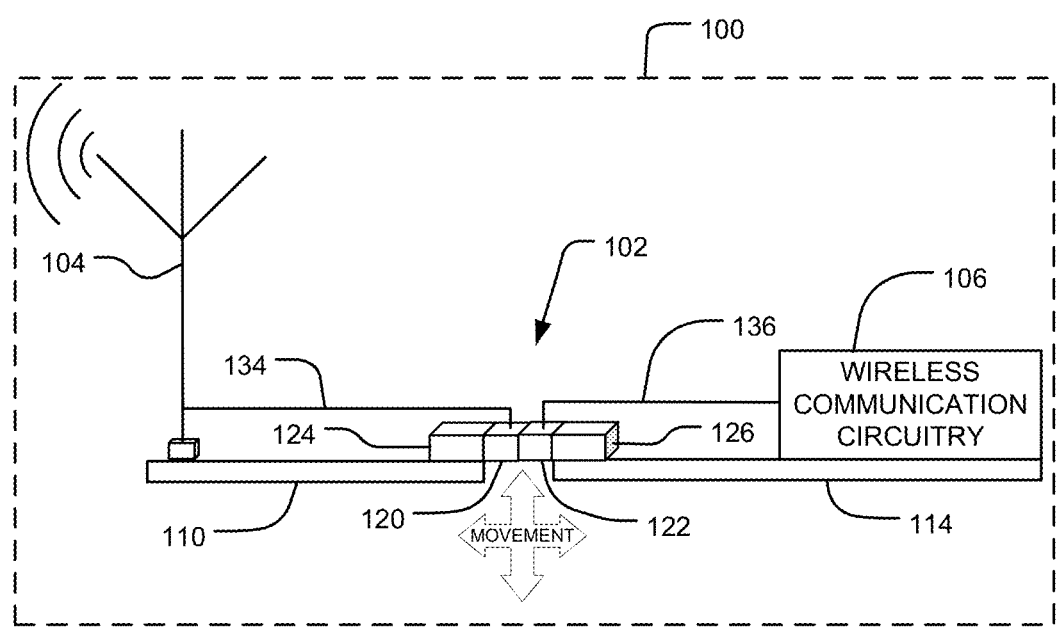

FIG. 1 provides a schematic illustration of an example prior art antenna connection to a wireless communication circuitry contact.

Figure 2:
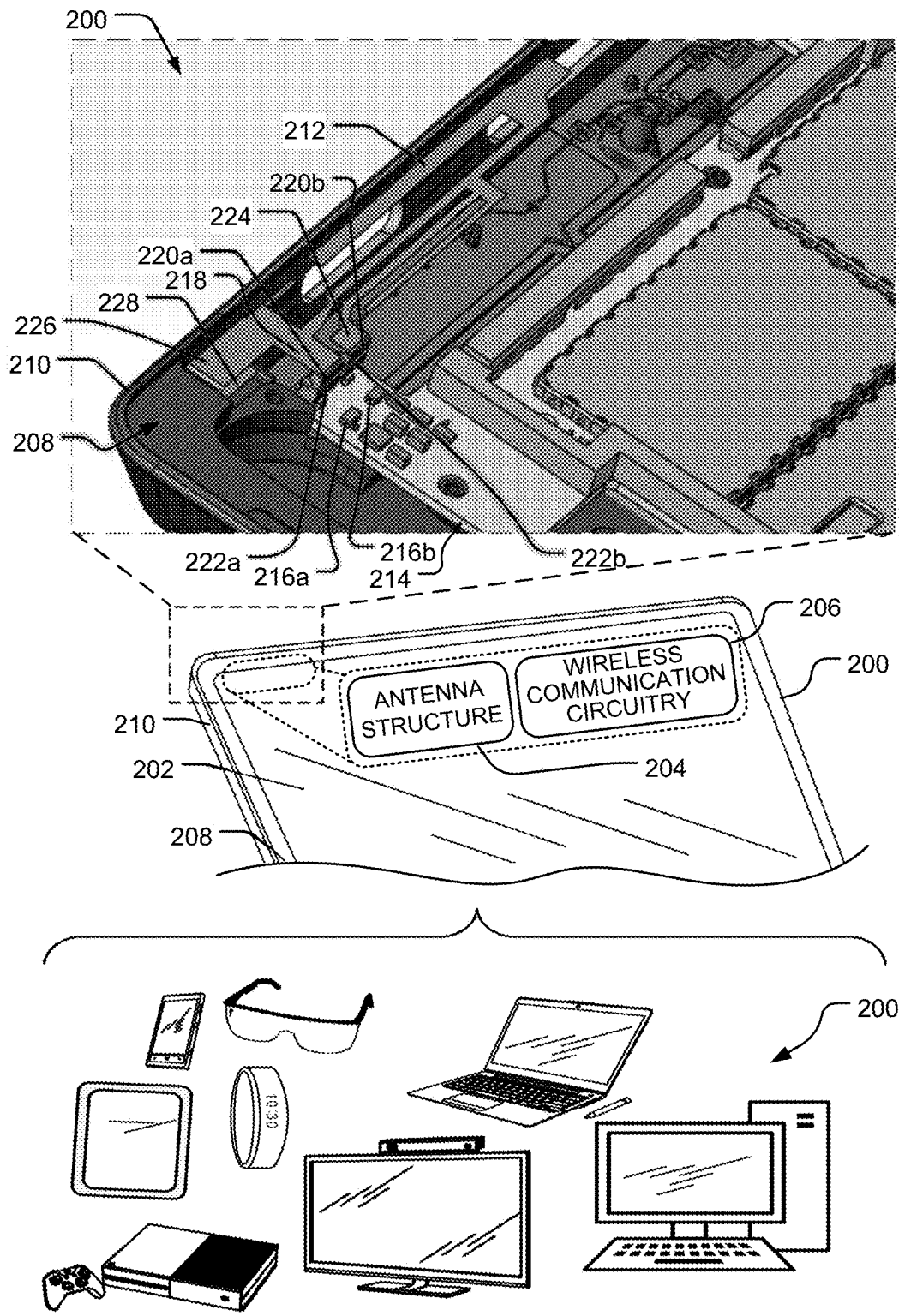

FIG. 2 provides a schematic illustration of an example electronic device with antenna structures and radio modules.

Figure 3:
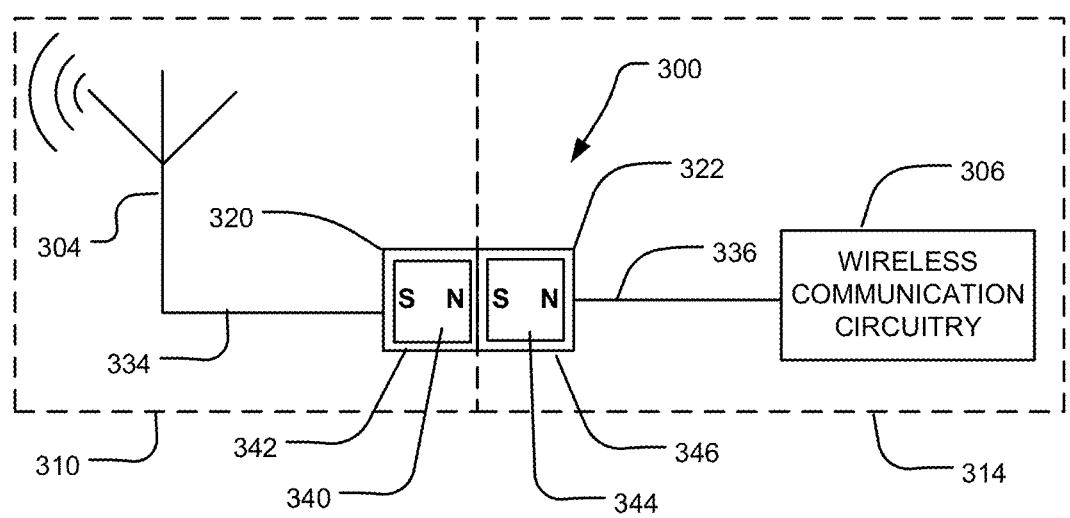

FIG. 3 provides a schematic illustration of an example embodiment of a magnetic mechanical connection between an antenna structure and wireless communication circuitry.

Figure 4:
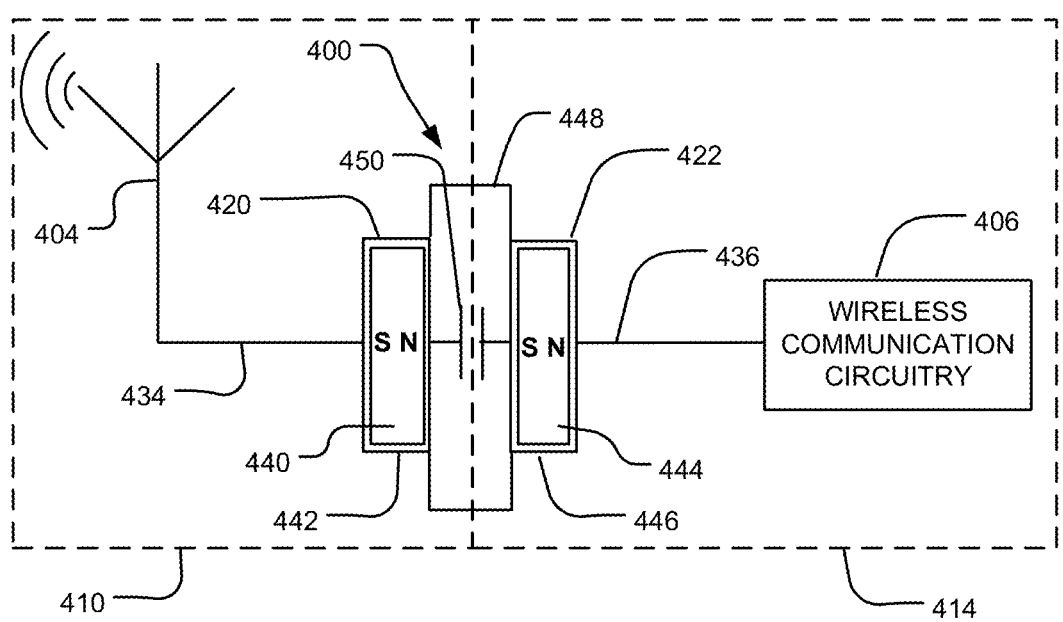

FIG. 4 provides a schematic illustration of an example embodiment of a magnetic mechanical connection between an antenna structure and wireless communication circuitry.

Figure 5:
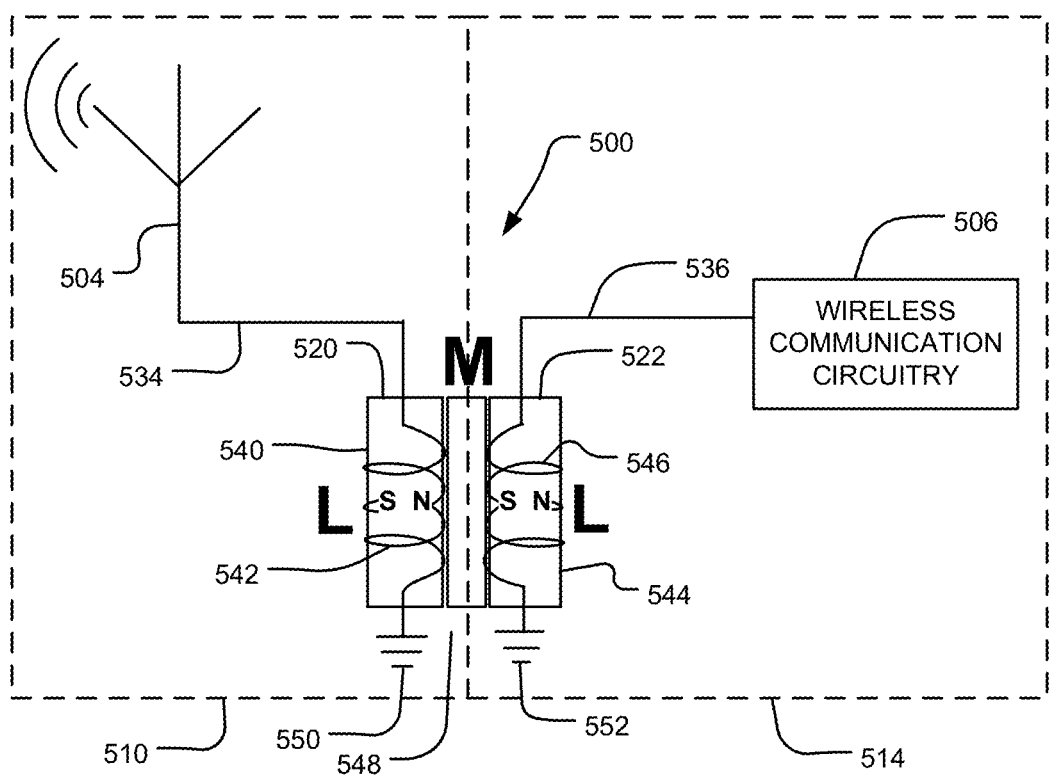

FIG. 5 provides a schematic illustration of an example embodiment of a magnetic mechanical connection between an antenna structure and wireless communication circuitry.

Figure 6:
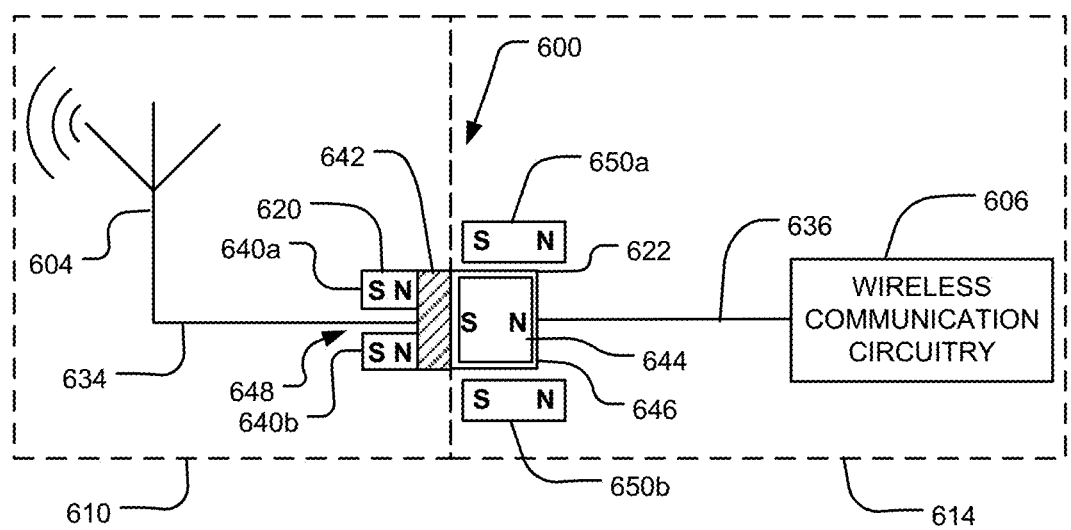

FIG. 6 provides a schematic illustration of an example embodiment of a magnetic mechanical connection between an antenna structure and wireless communication circuitry.

Figure 7:
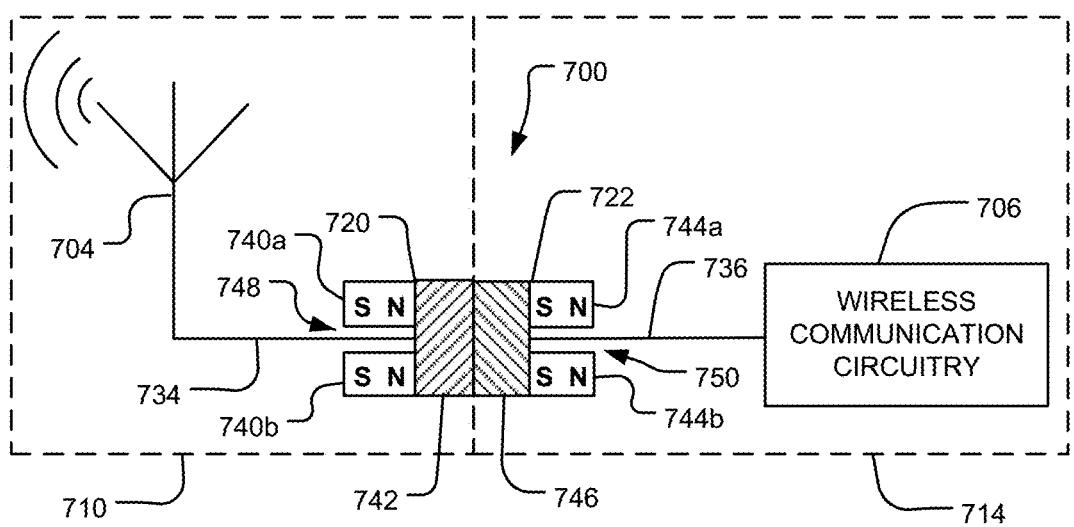

FIG. 7 provides a schematic illustration of an example embodiment of a magnetic mechanical connection between an antenna structure and wireless communication circuitry.

Figure 8:
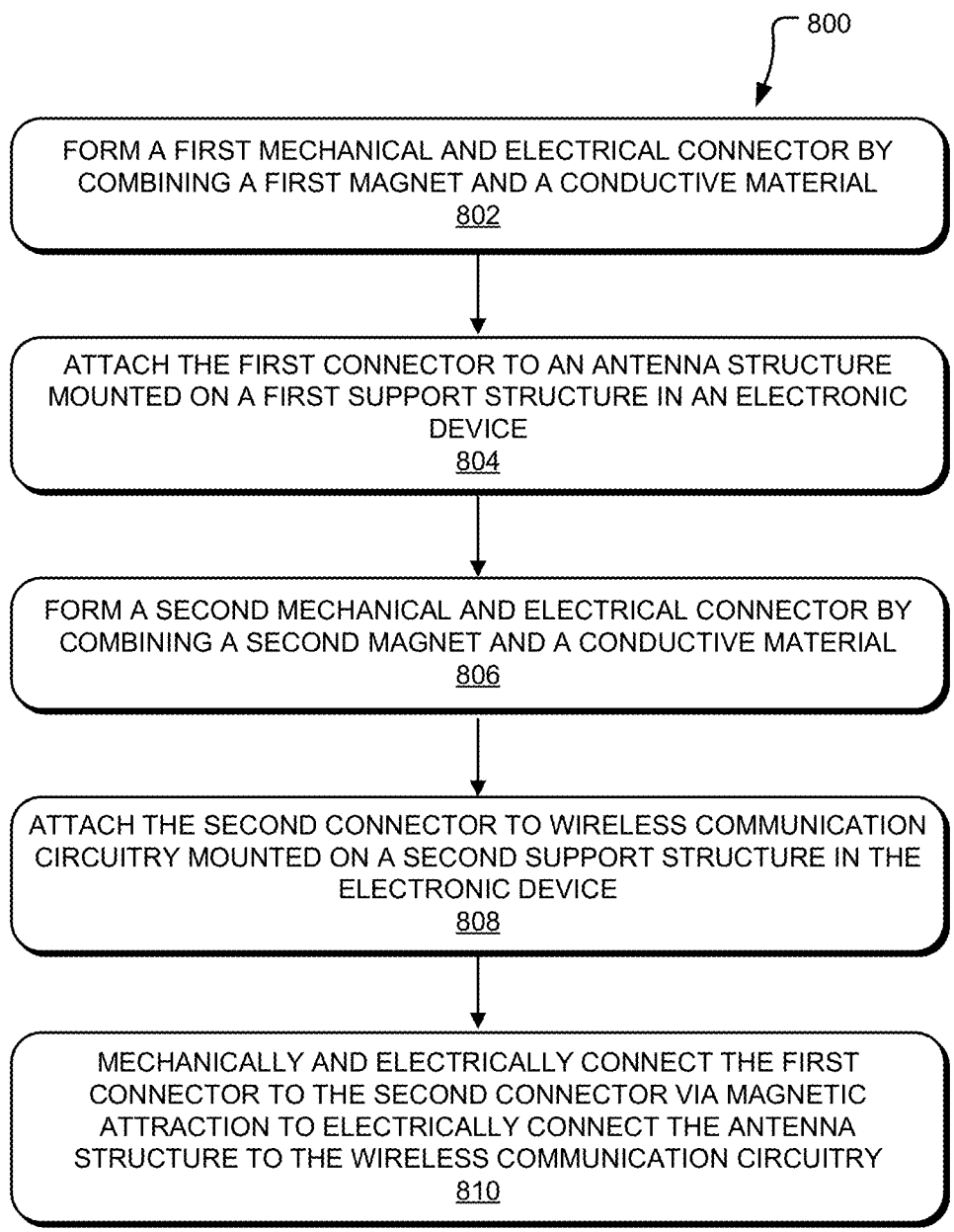

FIG. 8 provides a flow diagram of an example method for mechanically connecting an antenna structure to wireless communication circuitry using magnetic structures.

Figure 9:
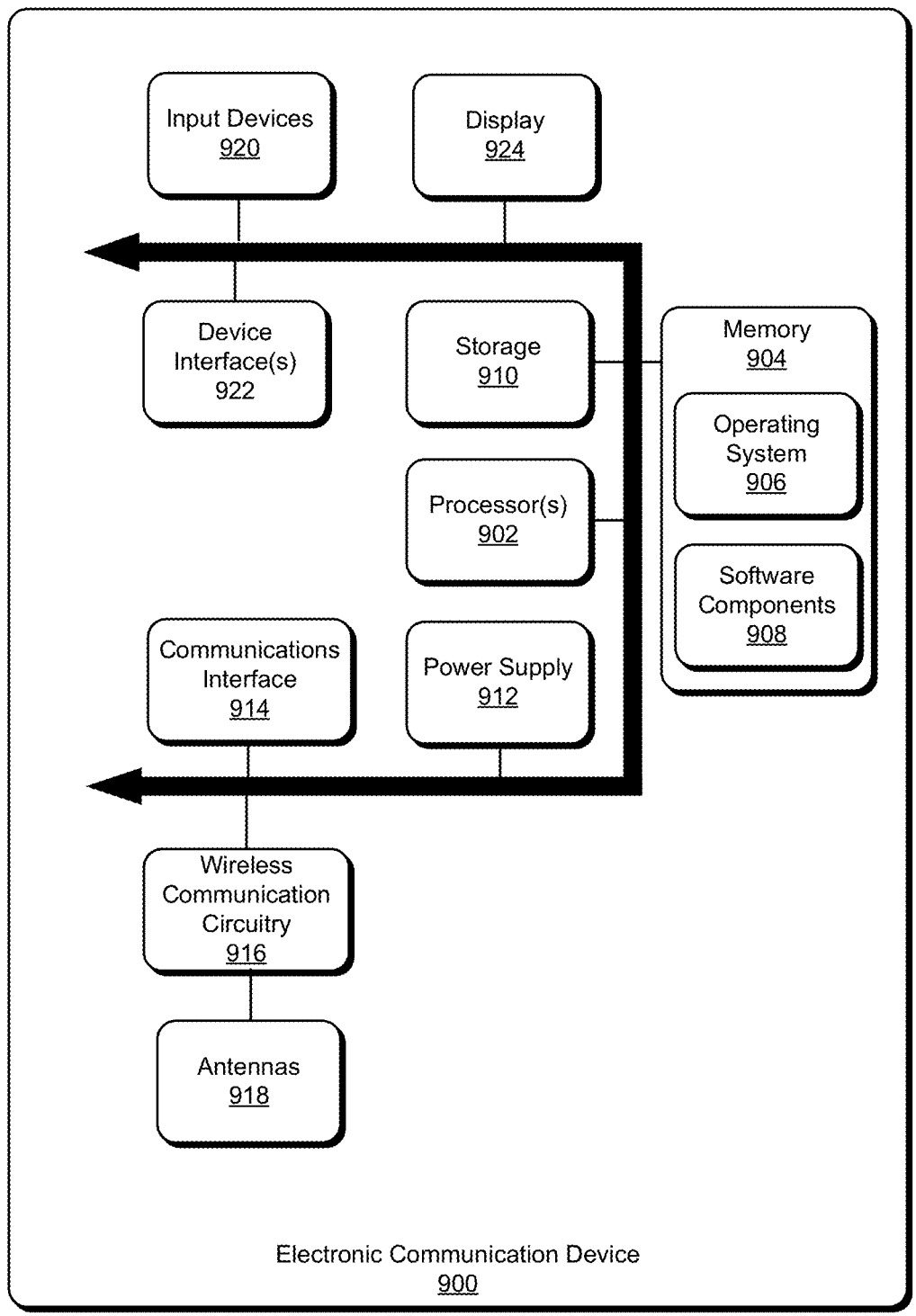

FIG. 9 provides a schematic illustration of an example of a computing system in which an antenna structure and wireless communication circuitry may be incorporated for wireless communication functionality.

DETAILED DESCRIPTION

An increasing number of electronic devices incorporate one or more of various wireless communication technologies, including, for example, Long-Term Evolution (LTE), $5^{th}$ Generation (5G) wireless, ultra-wideband (UWB), Bluetooth, Near Field Communications (NFC), Global Positioning System (GPS), and Wi-Fi (802.11 standards). Therefore, many antennas may be implemented in a small form-factor device, resulting in complicated antenna feed designs. Maintaining a long-term, reliable connection between antennas and corresponding wireless communication circuitry, e.g., receivers, transmitters, and transceivers, is desirable to maintain optimal antenna performance (i.e., effective efficiency and gain).

As depicted in FIG. 1, in many current electronic communication devices 100 an antenna 104 is mounted on a first structure, e.g., a housing 110 of the electronic communication device 100 and the related wireless communication circuitry 106 is mounted on a second structure, e.g., a circuit board 114 of the electronic communication device 100. Often the antenna 104 is physically connected to the chassis or housing 110 of the electronic communication device 100 to either connect to and take advantage of structures in the housing 110 to increase the sensitivity of the antenna 104 or place the antenna 104 as close as possible to unshielded windows in the housing 110 to receive unobstructed signals. In opposition, the wireless communication circuitry 106 are typically mounted on a circuit board 114 within the housing 110 to more easily connect to the power source and other electronic and processing components within the electronic communication device 100.

Often, there may be relative movement between the housing 110 and the circuit board 114. Over time, the mechanical connection 102 between an antenna connector 120 and a corresponding wireless communication circuitry connector 122 within the device 100 may become misaligned, thereby degrading antenna performance. A flexible interface 124 is often used to connect an antenna connector 120 at the end of the antenna lead 134 of an antenna 104 to the housing 110. In some implementations, a flexible interface 126 may be used to connect the wireless communication circuitry connector 122 at the end of a signal lead 136 of the wireless communication circuitry 106 to the circuit board 114. In some embodiments, a spring clip connected to the end of the antenna lead 134 is used as a combined flexible interface 124 and antenna connector 120 to provide mechanical spring force bias against the circuitry connector 122 in an attempt to maintain a resilient connection and resist movement. In other implementations, foam pads may be used as the flexible interface 126 for the circuitry connector 122 to maintain a resilient connection with the circuit board 114.

As noted, because the antenna 104 and the corresponding wireless communication circuitry 106 are mounted on separate structures (i.e., the chassis/housing 110 and the circuit board 114), the possibility for relative movement between these structures exists, which may offset the connection interface between the antenna 104 and the corresponding wireless communication circuitry 106 or suffer from inconsistent contact force and reduce antenna performance. For example, mobile telephones and tablets are often dropped, and the impact force may dislodge the antenna connector 120 and the wireless communication circuitry connector 122. Other, larger electronic devices with wireless communication technologies, e.g., computers, monitors, televisions, etc., may also be subjected to jostling during shipping, installation, and relocation. In some instances, the mechanical spring force of the spring clips can degrade over time and cause misalignment of the antenna connector 120, leading to gradually degrading antenna performance. The housing 110 may also shrink and expand with respect to other components over time due to changes in temperature and humidity in the environment. Mobile phones are also often placed in pants pockets and may be subjected to bending forces on the chassis/housing 110, which can result in relative movement with respect to the interior circuit board 114.

FIG. 2 provides an illustration of an electronic communication device 200 in an example implementation that may implement an antenna mounted to a first structure and a wireless communication circuitry mounted to a second structure, in which the structures may move with respect to each other. Nonexclusive examples of electronic communication devices 200 with wireless connectivity are depicted in FIG. 2 and may include mobile telephones, tablet computers, notebook computers, desktop computers, video game consoles and controllers, virtual reality glasses, smart watches, wireless and smart speakers, smart home security and automation devices, a smart appliance such as an Internet of Things (IoT) device, GPS tracking devices, televisions, and myriad other electronic devices that may be wirelessly connected to a network, directly to other devices in close proximity, or which are configured to receive signals from nearby or remote signal sources.

Each of these and other electronic communication devices 200 may include an integrated antenna structure 204 and a related wireless communication circuitry 206 enclosed within a housing 210. In many implementations, the housing 210 also acts as a chassis for mounting the internal electronic components. In some implementations, the chassis/housing 210 may be partially or wholly formed from a metallic and/or electrically-conductive material. Most current electronic communication devices 200 further include a display screen 202, which acts in conjunction with the housing 210 to fully encase the internal electronic components. In many implementations, the display screens 202 may also be touch screens and thus simultaneously function as both output and input devices for the electronic communications devices 200. A bezel area 208 is often defined about the perimeter of the display screen 202, where the display screen 202 and the housing 210 physically interface and connect.

The partial view of the electronic communication device 200 in FIG. 2 illustrates a corner portion of the chassis/housing 210 with the display screen 202 removed to reveal various internal components. In some implementations, as shown in the example of FIG. 2, the antenna structure 204 may include an antenna 212 that is folded in design to enable the antenna 212 to be incorporated into a compact area, e.g., the bezel area 208. The antenna 212 may further be electrically and mechanically attached to a component support structure, e.g., a chassis, formed as part of the housing 210 of the electronic communications device 200 via an antenna chassis lead 226 fixed to a chassis contact 228. The chassis contact 228 may be electrically connected to electrical ground. As noted above, the chassis/housing 210 may be formed from a metallic and/or electrically conductive material. Thus, connection of the antenna 212 to the chassis/housing 210 creates an integrated antenna structure for transmitting and receiving wireless signals for the electronic communication device 200. In some implementations, the antenna 212 and the electrically conductive chassis/housing 210 may combine to form an integrated radiating structure that enables the electronic communications device 200 to send and/or receive wireless signals. In some implementations, the antenna 212 may be formed as a wire trace design within the chassis/housing 210. The antenna 212 and/or the integrated radiating structure may be used to transmit and/or receive signals according to a variety of standardized or proprietary protocols, including, for example, LTE cellular, 5G wireless, UWB, Bluetooth, GPS, NFC, Wi-Fi standards, and others. The wireless communication circuitry 206 is representative of functional chipsets, circuitry, or other modules, e.g., combinations of chips, circuitry, and/or firmware in memory onboard the module, that enable the electronic communication device 200 to communicate using various wireless techniques and/or protocols, e.g., those noted.

The antenna 212 is also electrically attached to a printed circuit board (PCB) 214, which is representative of a separate component support structure that is used to mechanically support and electrically connect electronic components of the electronic communication device 200. For example, the circuit board 214 may connect various components of the electronic communications device 200 using conductive pathways, tracks, signal traces, and so on, etched from sheets of electrically conductive material (e.g., copper) laminated onto a non-conductive substrate. In the example embodiment of FIG. 2, the antenna 212 is mounted to the chassis/housing 210 and is electrically connected to the circuit board 214 and thereby to a corresponding wireless communications circuitry 206. The example embodiment of the antenna 212 is electrically connected to the circuit board 214 at a first antenna contact 218 and at a second antenna contact 224. In the example embodiment, each of the first and second antenna contacts 218, 224 are electrically connected to respective first and second wireless communication circuitry 216a, 216b, as further described below. The first and second wireless communication circuitry 216a, 216b may be a separated transmitter and receiver pair, or they may each be combined transceiver circuitry or other types of radio circuitry for generating and receiving data signals wirelessly on the same antenna 212.

According to the disclosed structures and methods herein, the first antenna contact 218 may be electrically and mechanically connected to a first magnetic antenna connector 220a. Similarly, the second antenna contact 224 may be electrically and mechanically connected to a second magnetic connector 220b. On the circuit board 214, the first wireless communication circuitry 216a may be electrically and mechanically connected to a first magnetic circuitry connector 222a and the second wireless communication circuitry 216b may be electrically and mechanically connected to a second magnetic circuitry connector 222b. As shown in FIG. 2, the first magnetic antenna connector 220a mechanically connects to the first magnetic circuitry connector 222a through mutual magnetic attraction and further provides an electrical connection between the first antenna contact 218 and the first wireless communication circuitry 216a mounted to the circuit board 214. Similarly, the second magnetic antenna connector 220b mechanically connects to the second magnetic circuitry connector 222b through mutual magnetic attraction and further provides an electrical connection between the second antenna contact 224 and the second wireless communication circuitry 216b mounted to the circuit board 214.

The magnetic connections provide a self-aligning connection between the antenna structure 204 and the wireless communication circuitry 206 supported by separate structures that may move somewhat independently of each other. The magnetic force provides continuous mutual attractive force to maintain reliable and consistent alignment and contact between the connectors. As a result, antenna performance (i.e., efficiency, gain, bandwidth) may be improved and maintained over the lifetime of the electronic communication device 200.

A first example implementation of a magnetic mechanical connection interface 300 between an antenna structure 304 and a wireless communication circuitry 306 is depicted n FIG. 3. In this embodiment, a direct feed connection is made between two feed elements made of magnetic and electric materials. The feed elements are mechanically aligned and electrically contacted by the magnetic attraction force of two different polarizations. An antenna portion 310 of the connection interface 300 is indicated within the first dashed bounding box. The antenna structure 304 is connected to an antenna lead 334, which is mechanically and electrically connected to a magnetic antenna connector 320. The magnetic antenna connector 320 may be formed by a magnetic core of a first magnet 340 covered by a first conductive coating 342. The first magnet 340 may be a neodymium magnet material or other appropriate magnetic material with sufficient strength to maintain a desired mechanical connection. The first magnet 340 may be coated or plated (e.g., by electroplating or chemical deposition plating) with an electrically conductive material, e.g., nickel, silver, gold, copper, zinc, or platinum, to form the first conductive coating 342. In the context of FIG. 2, the antenna lead 334 may be a winding or leg of the antenna structure 304, and a connector portion of the antenna lead 334 may be soldered to the first conductive coating 342 of the magnetic antenna connector 320 to provide both a mechanical and electrical connection between the two.

Similarly, the wireless circuitry portion 314 of the connection interface 300 is indicated within the second dashed bounding box. The wireless communication circuitry 306 is connected to a circuitry lead 336, which is mechanically and electrically connected to a magnetic circuitry connector 322. The magnetic circuitry connector 322 may be formed by a magnetic core of a second magnet 344 covered by a second conductive coating 346. The second magnet 344 may be a neodymium magnet material or other appropriate magnetic material with sufficient strength to maintain a desired mechanical connection. The second magnet 344 may be coated or plated (e.g., by electroplating or chemical deposition plating) with an electrically conductive material, e.g., nickel, silver, gold, copper, zinc, or platinum, to form the second conductive coating 346. The circuitry lead 336 may be soldered to the second conductive coating 346 of the magnetic circuitry connector 322 to provide both a mechanical and electrical connection between the two. In the context of FIG. 2, the circuitry lead 336 may be a trace within the circuit board on which the wireless communication circuitry 306 is mounted, and the magnetic circuitry connector 322 may be fixed to the circuit board at the end of the trace forming the circuitry lead 336.

In FIG. 3, the first magnet 340 is depicted as having a north-oriented polarity toward the connection interface 300, and the second magnet 344 is depicted as having a south-oriented polarity toward the connection interface 300 such that the first magnet 340 and the second magnet 344 are attracted to each other. However, the orientation of the magnets shown is depicted arbitrarily, and the first magnet 340 could have a south-oriented polarity toward the connection interface 300, and the second magnet 344 could have a north-oriented polarity toward the connection interface 300. Regardless, the first magnet 340 and the second magnet 344 are oriented to attract each other and create a robust mechanical connection between the magnetic antenna connector 320 and the magnetic circuitry connector 322. The mutual magnetic attraction resists mechanical movement or separation between the magnetic antenna connector 320 and the magnetic circuitry connector 322 and provides a realignment force if the magnetic antenna connector 320 and the magnetic circuitry connector 322 are subjected to separation forces. The first and second conductive coatings 342, 346 may be very thin and, as such, do not materially interfere with the mutual magnetic attraction between the magnetic antenna connector 320 and the magnetic circuitry connector 322. Surfaces of the magnetic antenna connector 320 and the magnetic circuitry connector 322 coated with the first and second conductive coatings 342, 346 are held in physical contact with each other to provide the electrical connection between the antenna structure 304 and the wireless communication circuitry 306 to provide transmission of signals between the two. The magnetic force provides the technical benefit of a continuous mutual attractive force to maintain reliable and consistent alignment and contact between the connectors, thereby better maintaining electrical contact. As a result, antenna performance (i.e., efficiency, gain, bandwidth) may be improved and maintained over the lifetime of the electronic communication device 300.

A second example implementation of a magnetic mechanical connection interface 400 between an antenna structure 404 and a wireless communication circuitry 406 is depicted in FIG. 4. In this embodiment, an electrical connection is created between two feed elements made of magnetic and electric materials. The feed elements are spaced apart with a spacer and aligned mechanically and electrically by the magnetic attraction force of two different polarizations. The feed elements are electrically connected by capacitive coupling. An antenna portion 410 of the connection interface 400 is indicated within the first dashed bounding box. The antenna structure 404 is connected to an antenna lead 434, which is mechanically and electrically connected to a magnetic antenna connector 420. The magnetic antenna connector 420 may be formed by a magnetic core of a first magnet 440 covered by a first conductive coating 442. The first magnet 440 may be a neodymnium magnet material or other appropriate magnetic material with sufficient strength to maintain a desired mechanical connection. The first magnet 440 may be coated or plated (e.g., by electroplating or chemical deposition plating) with an electrically conductive material, e.g., nickel, silver, gold, copper, zinc, or platinum, to form the first conductive coating 442. In the context of FIG. 2, the antenna lead 434 may be a winding or leg of the antenna structure 404, and a connector portion of the antenna lead 434 may be soldered to the first conductive coating 442 of the magnetic antenna connector 420 to provide both a mechanical and electrical connection between the two.

Similarly, the wireless circuitry portion 414 of the connection interface 400 is indicated within the second dashed bounding box. The wireless communication circuitry 406 is connected to a circuitry lead 436, which is mechanically and electrically connected to a magnetic circuitry connector 422. The magnetic circuitry connector 422 may be formed by a magnetic core of a second magnet 444 covered by a second conductive coating 446. The second magnet 444 may be a neodymnium magnet material or other appropriate magnetic material with sufficient strength to maintain a desired mechanical connection. The second magnet 444 may be coated or plated (e.g., by electroplating or chemical deposition plating) with an electrically conductive material, e.g., nickel, silver, gold, copper, zinc, or platinum, to form the second conductive coating 446. The circuitry lead 436 may be soldered to the second conductive coating 446 of the magnetic circuitry connector 422 to provide both a mechanical and electrical connection between the two. In the context of FIG. 2, the circuitry lead 436 may be a trace within the circuit board on which the wireless communication circuitry 406 is mounted, and the magnetic circuitry connector 422 may be fixed to the circuit board at the end of the trace forming the circuitry lead 436.

In FIG. 4, the first magnet 440 is depicted as having a north-oriented polarity toward the connection interface 400, and the second magnet 444 is depicted as having a south-oriented polarity toward the connection interface 400 such that the first magnet 440 and the second magnet 444 are attracted to each other. However, the orientation of the magnets shown is depicted arbitrarily, and the first magnet 440 could have a south-oriented polarity toward the connection interface 400, and the second magnet 444 could have a north-oriented polarity toward the connection interface 400. Regardless, the first magnet 440 and the second magnet 444 are oriented to attract each other and create a robust mechanical connection between the magnetic antenna connector 420 and the magnetic circuitry connector 422. The mutual magnetic attraction resists mechanical movement or separation between the magnetic antenna connector 420 and the magnetic circuitry connector 422 and provides a realignment force if the magnetic antenna connector 420 and the magnetic circuitry connector 422 are subjected to separation forces. The first and second conductive coatings 442, 446 may be very thin and, as such, do not materially interfere with the mutual magnetic attraction between the magnetic antenna connector 420 and the magnetic circuitry connector 422.

In the example embodiment of FIG. 4, the magnetic antenna connector 420 and the magnetic circuitry connector 422 are separated from each other by a spacer 448 that encases a capacitor 450. The spacer 548 may be made of any nonconductive or electrically insulating materials (e.g., plastic, FR4, Epoxy, etc.) or magneto-dielectric materials (e.g., ferrites). Surfaces of the magnetic antenna connector 420 and the magnetic circuitry connector 422 coated with the first and second conductive coatings 442, 446 are held in physical contact with opposing sides of the spacer 448. Opposing contact leads of the capacitor 450 are positioned on the lateral sides of the spacer 448 to provide the electrical connection between the antenna structure 404 and the wireless communication circuitry 406 to provide transmission of signals between the two. The width of the spacer 448 may be chosen in conjunction with the relative strength of the magnets to ensure adequate mechanical attractive force across the distance between the magnetic antenna connector 420 and the magnetic circuitry connector 422 to maintain alignment and the electrical connection against anticipated external forces. The magnetic force provides the technical benefit of a continuous mutual attractive force to maintain reliable and consistent alignment and contact between the connectors in the context of a capactive antenna coupling, thereby better maintaining electrical contact. As a result, antenna performance (i.e., efficiency, gain, bandwidth) may be improved and maintained over the lifetime of the electronic communication device 400.

A third example implementation of a magnetic mechanical connection interface 500 between an antenna structure 504 and a wireless communication circuitry 506 is depicted in FIG. 5. In this embodiment, an electrical connection is created between two feed elements made of magnetic and electric materials. The feed elements are spaced apart with a spacer and aligned mechanically and electrically by the magnetic attraction force of two different polarizations. The feed elements are electrically connected by inductive coupling. An antenna portion 510 of the connection interface 500 is indicated within the first dashed bounding box. The antenna structure 504 is connected to an antenna lead 534, which is mechanically and electrically connected to a magnetic antenna connector 520. The magnetic antenna connector 520 may be formed by a magnetic core of a first magnet 540 covered by a first inductor winding 542. The first magnet 540 may be a neodymnium magnet material or other appropriate magnetic material with sufficient strength to maintain a desired mechanical connection. The first inductor winding 542 may be an electrically conductive wire, e.g., nickel, silver, gold, copper, zinc, or platinum. In the context of FIG. 2, the antenna lead 534 may be a winding or leg of the antenna structure 504, and a connector portion of the antenna lead 534 may be soldered to a first end of the first inductor winding 542 of the magnetic antenna connector 520 to provide both a mechanical and electrical connection between the two. A second end of the first inductor winding 542 may be connected to a ground plane 550 to ensure appropriate functioning of the first inductor winding 542.

Similarly, the wireless circuitry portion 514 of the connection interface 500 is indicated within the second dashed bounding box. The wireless communication circuitry 506 is connected to a circuitry lead 536, which is mechanically and electrically connected to a magnetic circuitry connector 522. The magnetic circuitry connector 522 may be formed by a magnetic core of a second magnet 544 covered by a second inductor winding 546. The second magnet 544 may be a neodymnium magnet material or other appropriate magnetic material with sufficient strength to maintain a desired mechanical connection. The second inductor winding 546 may be an electrically conductive wire, e.g., nickel, silver, gold, copper, zinc, or platinum. The circuitry lead 536 may be soldered to the second inductor winding 546 of the magnetic circuitry connector 522 to provide both a mechanical and electrical connection between the two. In the context of FIG. 2, the circuitry lead 536 may be a trace within the circuit board on which the wireless communication circuitry 506 is mounted, and the magnetic circuitry connector 522 may be fixed to the circuit board at the end of the trace forming the circuitry lead 536. The circuitry lead 536 may be soldered to a first end of the second inductor winding 546 of the magnetic circuitry connector 522 to provide both a mechanical and electrical connection between the two. A second end of the second inductor winding 546 may be connected to a ground plane 552 to ensure appropriate functioning of the second inductor winding 546.

In FIG. 5, the first magnet 540 is depicted as having a north-oriented polarity toward the connection interface 500, and the second magnet 544 is depicted as having a south-oriented polarity toward the connection interface 500 such that the first magnet 540 and the second magnet 544 are attracted to each other. However, the orientation of the magnets shown is depicted arbitrarily, and the first magnet 540 could have a south-oriented polarity toward the connection interface 500, and the second magnet 544 could have a north-oriented polarity toward the connection interface 500. Regardless, the first magnet 540 and the second magnet 544 are oriented to attract each other and create a robust mechanical connection between the magnetic antenna connector 520 and the magnetic circuitry connector 522. The mutual magnetic attraction resists mechanical movement or separation between the magnetic antenna connector 520 and the magnetic circuitry connector 522 and provides a realignment force if the magnetic antenna connector 520 and the magnetic circuitry connector 522 are subjected to separation forces. The first and second inductor windings 542, 546 may be very thin and, as such, do not materially interfere with the mutual magnetic attraction between the magnetic antenna connector 520 and the magnetic circuitry connector 522.

In the example embodiment of FIG. 5, the magnetic antenna connector 520 and the magnetic circuitry connector 522 are also separated from each other by a spacer 548. The spacer 548 may be made of any nonconductive or electrically insulating materials (e.g., plastic, FR4, Epoxy, etc.) or magneto-dielectric materials (e.g., ferrites). Surfaces of the magnetic antenna connector 520 and the magnetic circuitry connector 522 wrapped with the first and second inductor windings 542, 546 are held in physical contact with opposing sides of the spacer 548. Transmission of signals between the magnetic antenna connector 520 and the magnetic circuitry connector 522 occurs by mutual inductive coupling (M) between the first inductor winding 542 and the second inductor winding 546. The width of the spacer 548 may be chosen in conjunction with the relative strength of the magnets to ensure adequate mechanical attractive force across the distance between the magnetic antenna connector 520 and the magnetic circuitry connector 522 to maintain alignment and the electrical connection against anticipated external forces. The magnetic force provides the technical benefit of a continuous mutual attractive force to maintain reliable and consistent alignment and contact between the connectors in the context of an inductive antenna connection, thereby better maintaining electrical contact. As a result, antenna performance (i.e., efficiency, gain, bandwidth) may be improved and maintained over the lifetime of the electronic communication device 500.

A fourth example implementation of a magnetic mechanical connection interface 600 between an antenna structure 604 and a wireless communication circuitry 606 is depicted n FIG. 6. In this embodiment, a guided antenna feed connection is contemplated. For one connector, the feed element is made of separate magnetic and electric materials, and for the other connector, the feed element is made of a combination of magnetic and electric materials and additional guide magnet(s) to mechanically position the connector in a desired location. The antenna feed elements are mechanically aligned and electrically contacted by the magnetic attraction force of two different polarizations. An antenna portion 610 of the connection interface 600 is indicated within the first dashed bounding box. The antenna structure 604 is connected to an antenna lead 634, which is mechanically and electrically connected to a magnetic antenna connector 620. The magnetic antenna connector 620 may be formed by a pair of first magnets 640a, 640b separated from each other to form a gap 648. In this implementation, the first pair of magnets 640a, 640b may be uncoated, i.e., they may not be electrically conductive. Alternately, the first pair of magnets 640a, 640b may be a single magnet formed as a hollow tube. The first magnets 640a, 640b may be affixed to an electrically conductive spacer 642. The first magnets 640a, 640b may be a neodymnium magnet material or other appropriate magnetic material with sufficient strength to maintain a desired mechanical connection. The conductive spacer 642 may be an electrically conductive metal, e.g., nickel, silver, gold, copper, zinc, or platinum. The antenna lead 634 may be positioned to pass between the first magnets 640a, 640b through the gap 648 and mechanically and electrically connected to the conductive spacer 642, e.g., by a solder connection. In the context of FIG. 2, the antenna lead 634 may be a winding or leg of the antenna structure 604, and a connector portion of the antenna lead 634 may be soldered to the conductive spacer 642 to provide both a mechanical and electrical connection between the two.

Similarly, the wireless circuitry portion 614 of the connection interface 600 is indicated within the second dashed bounding box. The wireless communication circuitry 606 is connected to a circuitry lead 636, which is mechanically and electrically connected to a magnetic circuitry connector 622. The magnetic circuitry connector 622 may be formed by a magnetic core of a second magnet 644 covered by a conductive coating 646. The second magnet 644 may be a neodymnium magnet material or other appropriate magnetic material with sufficient strength to maintain a desired mechanical connection. The second magnet 644 may be coated or plated (e.g., by electroplating or chemical deposition plating) with an electrically conductive material, e.g., nickel, silver, gold, copper, zinc, or platinum, to form the conductive coating 646. The circuitry lead 636 may be soldered to the conductive coating 646 of the magnetic circuitry connector 622 to provide both a mechanical and electrical connection between the two. In the context of FIG. 2, the circuitry lead 636 may be a trace within the circuit board on which the wireless communication circuitry 606 is mounted, and the magnetic circuitry connector 622 may be fixed to the circuit board at the end of the trace forming the circuitry lead 636.

Additional guide magnets 650a, 650b may be positioned on opposing sides of the second magnet 644. The guide magnets 650a, 650b may be oriented in the same polarity direction as the second magnet 644 such that the guide magnets 650a, 650b repel the second magnet 644 and keep the second magnet 644 centered between the guide magnets 650a, 650b. With this configuration, if the second magnet 644 is dislodged from its desired position for contact of the magnetic circuitry connector 622 with the magnetic antenna connector 620, the repulsive magnetic forces imparted by the guide magnets 650a, 650b aid in urging the second magnet 644, and thus the magnetic circuitry connector 622 into the appropriate contact position. It should be apparent that the structures of the magnetic circuitry connector 622 and the magnetic antenna connector 620 could be switched. Further, in alternate embodiments, positioning of both of the magnetic antenna connector 620 and the magnetic circuitry connector 622 could be aided by guide magnets fixed to structures on a chassis/housing and circuit board, respectively. It should also be apparent that in additional alternative embodiments, guide magnets such as depicted in FIG. 6 and described above could be included with any of the embodiments described herein on either or both sides of the connection between the magnetic circuitry connector and the magnetic antenna connector to help guide and position either or both of the connectors.

In FIG. 6, the first magnets 640a, 640b are depicted as having a north-oriented polarity toward the connection interface 600, and the second magnet 644 and the corresponding guide magnets 650a, 650b are depicted as having a south-oriented polarity toward the connection interface 600 such that the first magnets 640a, 640b are attracted to the second magnet 644 and the guide magnets 650a, 650b, and vice versa. However, the orientation of the magnets shown is depicted arbitrarily, and the first magnets 640a, 640b could have a south-oriented polarity toward the connection interface 600, and the second magnet 644 and the guide magnets 650a, 650b could have a north-oriented polarity toward the connection interface 600. Regardless, the first magnets 640a, 640b and the second magnet 644 are oriented to attract each other and create a robust mechanical connection between the magnetic antenna connector 620 and the magnetic circuitry connector 622. The magnetic attraction resists mechanical movement or separation between the magnetic antenna connector 620 and the magnetic circuitry connector 622 and provides a realignment force if the magnetic antenna connector 620 and the magnetic circuitry connector 622 are subjected to separation forces.

The material of the conductive spacer 642 may be selected to be a material that is magnetizable and thus contributes to the magnetic force of the magnetic antenna connector. Alternatively, the width or thickness of the conductive spacer 642 and the strength of the first magnets 640a, 640b may be chosen such that the combination forming the magnetic antenna connector 620 is sufficiently strong to maintain a desired magnetic force and mechanical connection. The conductive coating 646 may be very thin and, as such, does not materially interfere with the magnetic attraction between the magnetic antenna connector 620 and the magnetic circuitry connector 622. The magnetic antenna connector 620 and the magnetic circuitry connector 622 are held in robust physical contact with each other to provide the electrical connection between the antenna structure 604 and the wireless communication circuitry 606 to provide transmission of signals between the two. The addition of the guide magnets provides the technical benefit of additional alignment force in addition to the continuous mutual attractive force to maintain reliable and consistent alignment and contact between the connectors, thereby better maintaining electrical contact. As a result, antenna performance (i.e., efficiency, gain, bandwidth) may be improved and maintained over the lifetime of the electronic communication device 600.

A fifth example implementation of a magnetic mechanical connection 16one16face 700 between an antenna structure 704 and a wireless communication circuitry 706 is depicted n FIG. 7. In this embodiment, an attracted antenna feed connection is contemplated. For each connector, the feed element is made of a combination of magnetic and electric materials. The antenna feed elements are mechanically aligned and electrically connected by the magnetic attraction force of two different polarizations. An antenna portion 710 of the connection interface 700 is indicated within the first dashed bounding box. The antenna structure 704 is connected to an antenna lead 734, which is mechanically and electrically connected to a magnetic antenna connector 720. The magnetic antenna connector 720 may be formed by a pair of first magnets 740a, 740b separated from each other to form a gap 748. Alternately, the first pair of magnets 740a, 740b may be a single magnet formed as a hollow tube. The first magnets 740a, 740b may be affixed to an electrically conductive spacer 742. The first magnets 740a, 740b may be a neodymnium magnet material or other appropriate magnetic material with sufficient strength to maintain a desired mechanical connection. The conductive spacer 742 may be an electrically conductive metal, e.g., nickel, silver, gold, copper, zinc, or platinum. The antenna lead 734 may be positioned to pass between the first magnets 740a, 740b through the gap 748 and mechanically and electrically connected to the conductive spacer 742, e.g., by a solder connection. In the context of FIG. 2, the antenna lead 734 may be a winding or leg of the antenna structure 704, and a connector portion of the antenna lead 734 may be soldered to the conductive spacer 742 to provide both a mechanical and electrical connection between the two.

Similarly, the wireless circuitry portion 714 of the connection interface 700 is indicated within the second dashed bounding box. The wireless communication circuitry 706 is connected to a circuitry lead 736, which is mechanically and electrically connected to a magnetic circuitry connector 722. The magnetic circuitry connector 722 may be formed by a pair of second magnets 744a, 744b separated from each other to form a gap 750. Alternately, the second pair of magnets 744a, 744b may be a single magnet formed as a hollow tube. The second magnets 744a, 744b may be affixed to a second electrically conductive spacer 746. The second magnets 744a, 744b may be a neodymnium magnet material or other appropriate magnetic material with sufficient strength to maintain a desired mechanical connection. The second conductive spacer 746 may be an electrically conductive metal, e.g., nickel, silver, gold, copper, zinc, or platinum. The circuitry lead 736 may be positioned to pass between the second magnets 744a, 744b through the gap 750 and mechanically and electrically connected to the conductive spacer 746, e.g., by a solder connection. In the context of FIG. 2, the circuitry lead 736 may be a trace within the circuit board on which the wireless communication circuitry 706 is mounted, and the magnetic circuitry connector 722 may be mounted to the circuit board and soldered to the end of the conductive trace forming the circuitry lead 736 to provide both a mechanical and electrical connection between the two.

In FIG. 7, the first magnets 740a, 740b are depicted as having a north-oriented polarity toward the connection interface 700, and the second magnets 744a, 744b are depicted as having a south-oriented polarity toward the connection interface 700 such that the first magnets 740a, 740b are attracted to the second magnets 744a, 744b, and vice versa. However, the orientation of the magnets shown is depicted arbitrarily, and the first magnets 740a, 740b could have a south-oriented polarity toward the connection interface 700, and the second magnets 744a, 744b could have a north-oriented polarity toward the connection interface 700. Regardless, the first magnets 740a, 740b, and the second magnets 744a, 744b are oriented to attract each other and create a robust mechanical connection between the magnetic antenna connector 720 and the magnetic circuitry connector 722. The magnetic attraction resists mechanical movement or separation between the magnetic antenna connector 720 and the magnetic circuitry connector 722 and provides a realignment force if the magnetic antenna connector 720 and the magnetic circuitry connector 722 are subjected to separation forces.

The materials of the conductive spacers 742, 746 may be selected to be materials that are magnetizable and thus contribute to the magnetic force of the magnetic antenna connector 720 and the magnetic circuitry connector, respectively. Alternatively, the width or thickness of the conductive spacers 742, 746 and the strength of the first magnets 740a, 740b and the second magnets 744a, 744b may be chosen such that the combinations forming the magnetic antenna connector 720 and the magnetic circuitry connector 722 are sufficiently strong to maintain a desired magnetic force and mechanical connection. The magnetic antenna connector 720 and the magnetic circuitry connector 722 are held in robust physical contact with each other to provide the electrical connection between the antenna structure 704 and the wireless communication circuitry 706 to provide transmission of signals between the two. The magnetic force provides the technical benefit of a continuous mutual attractive force to maintain reliable and consistent alignment and contact between the connectors, thereby better maintaining electrical contact. As a result, antenna performance (i.e., efficiency, gain, bandwidth) may be improved and maintained over the lifetime of the electronic communication device 700.

FIG. 8 is a flow diagram depicting an example method 800 for providing a robust mechanical and electrical connection between contacts of an antenna structure mounted on a first component support structure, e.g., a chassis/housing, and contacts of wireless communication circuitry mounted on a second component support structure, e.g., a circuit board, which may move independently with respect to the first component support structure. In a forming operation 802 of the method 800, a first mechanical and electrical connector is formed by combining a first magnet and a conductive material. For example, in one implementation, the first magnet may be covered by a conductive coating to form the electrical connector. In an attaching operation 804, the first connector may be attached to an antenna structure mounted on a first component support structure of an electronic communication device. In an example implementation, the first component support structure may be a chassis or housing of the electronic communication device.

In a forming operation 806 of the method 800, a second mechanical and electrical connector is formed by combining a second magnet and a conductive material. For example, in one implementation, the second magnet may be covered by a conductive coating to form the electrical connector. In an attaching operation 808, the second connector may be attached to wireless communication circuitry mounted on a second component support structure of an electronic communication device. In an example implementation, the second component support structure may be a circuit board of the electronic communication device. In a connecting operation 810, the first connector may be mechanically connected to the second connector via magnetic attraction between the first magnet and the second magnet to electrically connect the antenna structure to the wireless communication circuitry. Through this method 800, even with relative movement between the first component support structure and the second component support structure, the magnetic force provides continuous attractive force to maintain resilient alignment and robust mechanical and electrical connection between the first connector and the second connector. As a result, antenna performance (i.e., efficiency, gain, bandwidth) may be improved and maintained over the lifetime of the electronic communication device.

FIG. 9 illustrates an example electronic communication device 900 for implementing the features and operations of the described technology. The electronic communication device 900 may embody any network-connected and/or network-capable device and may be a client device, such as a laptop computer, a mobile telephone device, a desktop computer, a tablet computer; a server/cloud computer device; an internet-of-things device, e.g., a television, a wireless speaker, a thermostat, a doorbell/security camera, etc.; an electronic accessory, e.g., a game controller, a smart watch, etc.; or another electronic device with one-way or two-way wireless communication capabilities.

The electronic communication device 900 may include one or more processor(s) 902 and a memory 904 and one or more storage devices 910. The memory 904 generally includes both volatile memory (e.g., RAM) and nonvolatile memory (e.g., flash memory). An operating system 906 is instantiated in the memory 904 and is executed by the processor(s) 902. The electronic communication device 900 includes a power supply 912, which is powered by one or more batteries or other power storage sources and provides power to other components of the electronic communication device 900. The power supply 912 may also be connected to an external power source that overrides or recharges the built-in batteries or other power sources.

The storage devices 910 of the electronic communication device 900 may include a variety of tangible processor-readable storage media. Tangible processor-readable storage can be embodied by any available media that can be accessed by the electronic communication device 900 and includes both volatile and nonvolatile storage media, removable and non-removable storage media. Tangible processor-readable storage media excludes communications signals (e.g., signals per se) and includes volatile and nonvolatile, removable and non-removable storage media implemented in any method or technology for storage of information such as processor-readable instructions, data structures, program modules, or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage, or other magnetic storage devices, or any other tangible medium which can be used to store the desired information and which can be accessed by the electronic communication device 900.

In an example electronic communication device 900, as shown in FIG. 9, one or more software components 908, such as firmware, software applications, instruction modules, communications interface drivers, peripheral drivers, etc., are stored in the memory 904 and/or on the storage device 910, may be instantiated by the operating system 906 and executed by processor(s) 902. Exemplary software applications may include electronic mail programs, scheduling programs, personal information management programs, word processing programs, spreadsheet programs, Internet browser programs, music file management programs, and photograph and video file management programs. The storage device 910 may include one or more tangible storage media devices and may store data used by application software, including locally and globally unique identifiers, requests, responses, and other data and be local to the electronic communication device 900 or may be remote and communicatively connected to the electronic communication device 900.

Various software components 908 described herein may be executable by the one or more processors 902, which may include logic machines configured to execute hardware or firmware instructions. For example, the processors 902 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Aspects of processors 902 and memory 904 may be integrated together into one or more hardware logic components. Such hardware-logic components may include field-programmable gate arrays (FPGAs), program- and application-specific integrated circuits (PASIC/ASICs), program-specific and application-specific standard products (PSSP/ASSPs), system-on-a-chip (SOC), and complex programmable logic devices (CPLDs), for example.

The terms "module," "program," and "engine" may be used to describe one or more of a hardware component, a software process, or a combination of both, implemented to perform a particular function. It will be understood that different modules, programs, and/or engines may be instantiated from the same application, service, code block, object, library, routine, script, application program interface (API), function, etc. Likewise, the same module, program, and/or engine may be instantiated by different applications, services, code blocks, objects, routines, APIs, functions, etc. When incorporating software, the terms "module," "program," and "engine" may encompass individual or groups of executable files, data files, libraries, drivers, scripts, database records, etc. It may be appreciated that a "service," as used herein, is an application program executable across one or multiple user sessions. A service may be available to one or more system components, programs, and/or other services. In some implementations, a service may run on one or more server computing devices.

The electronic communication device 900 may include a communications interface 914 (e.g., a network adapter) that manages one or more wireless communication circuitry 916 for establishing connections over a wide-area network (WAN) or local-area network (LAN), for example, ethernet ports, wireless transmitters, wireless receivers, or transceivers (i.e., a combined transmitter and receiver), which may be connected to one or more antenna(s) 918 to provide network connectivity (e.g., to mobile phone networks such as LTE and 5G, GPS, Bluetooth®, Near Field Sensing, etc.) or to one or more other devices on a network (e.g., mobile devices, desktop computers, laptop computers, or servers). In some embodiments, multiple wireless communication circuitry 916 and antennas 918 may be employed to communicate incoming and outgoing radiofrequency carrier signals on various different frequency bandwidths and utilize different communication protocols. As described herein, the connection interface between the wireless communication circuitry 916 and antennas 918 may include magnetic alignment structures to assist in maintaining a resilient connection. It should be appreciated that the network connections shown are examples and that other computing devices and structures and protocols for establishing a communications link between the electronic communication device 900 and other devices may be used.

The communications interface 914 may provide for transmission of intangible processor-readable communication signals. In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

The electronic communication device 900 may include one or more input devices 920 such that a user may enter commands and information (e.g., a touch screen, a keyboard, a mouse, a microphone, etc.). These and other input devices may be coupled to other internal components or modules by one or more device interfaces 922, such as a serial port interface, parallel port, or universal serial bus (USB). The electronic communication device 900 may further include a display device 924, such as an LCD display, and LED display, or a touch screen display.

An example electronic communication device is disclosed herein including the following elements. A first component support structure is provided and an antenna structure is mounted on the first component support structure and is configured to communicate wireless radiofrequency signals. A first connector is connected to the antenna structure. A second component support structure is mechanically coupled to the first component support structure and is capable of movement with respect to the first component support structure. Wireless communication circuitry is mounted on the second component support structure and is configured to communicate with the antenna structure using radiofrequency carrier signals. A second connector is connected to the wireless communication circuitry. The first connector and the second connector are mechanically connected and resiliently aligned by magnetic attraction therebetween and are communicatively coupled to communicate the radiofrequency carrier signal between the wireless communication circuitry and the antenna structure. The magnetic force provides the technical benefit of a continuous mutual attractive force to maintain reliable and consistent alignment and contact between the connectors, thereby better maintaining electrical contact. As a result, antenna performance (i.e., efficiency, gain, bandwidth) may be improved and maintained over the lifetime of the electronic communication device.

In another example, one or more of the first connector and the second connector of the electronic communication device includes a respective magnet coated with electrically conductive material.

In another example of the electronic communication device, a spacer is interposed between the first connector and the second connector. A capacitor is positioned within the spacer. A first lead of the capacitor is electrically connected to the first connector. A second lead of the capacitor is electrically connected to the second connector. The magnetic force provides the technical benefit of a continuous mutual attractive force to maintain reliable and consistent alignment and contact between the connectors in the context of a capacitive antenna coupling, thereby better maintaining electrical contact. As a result, antenna performance (i.e., efficiency, gain, bandwidth) may be improved and maintained over the lifetime of the electronic communication device.

In another example of the electronic communication device, one or more of the first connector and the second connector of the electronic communication device includes a respective magnet coated with electrically conductive material. A spacer is interposed between the first connector and the second connector. A capacitor positioned within the spacer. A first lead of the capacitor is electrically connected to the first connector. A second lead of the capacitor is electrically connected to the second connector.

In another example of the electronic communication device, the first connector includes a first magnet. The second connector includes a second magnet. A spacer is interposed between the first connector and the second connector. A first conductor winding in the first connector is wrapped around the first magnet and includes a first lead that is electrically coupled to the antenna structure. A second conductor winding in the second connector is wrapped around the second magnet and includes a second lead that is electrically coupled to the wireless communication circuitry. The magnetic force provides the technical benefit of a continuous mutual attractive force to maintain reliable and consistent alignment and contact between the connectors in the context of an inductive antenna connection, thereby better maintaining electrical contact. As a result, antenna performance (i.e., efficiency, gain, bandwidth) may be improved and maintained over the lifetime of the electronic communication device In another example of the electronic communication device, one of first connector and the second connector includes a coated magnet covered with electrically conductive material. One of the first connector and the second connector includes an uncoated magnet that is not covered with electrically conductive material. An electrically conductive spacer is attached to the uncoated magnet and is positionally configured to interface between the coated magnet and the uncoated magnet. The antenna structure is electrically coupled to the electrically conductive spacer and the wireless communication circuitry through the first connector and the second connector.

In another example of the electronic communication device, the uncoated magnet comprises two or more magnets that together define a gap through which an electrical connector connecting either the antenna structure or the wireless communication circuitry to the electrically conductive spacer passes.

In another example of the electronic communication device, the first connector includes a first magnet. The second connector includes a second magnet. A first electrically conductive spacer is attached to the first magnet and is positionally configured to interface between the first magnet and the second magnet. A second electrically conductive spacer attached to the second magnet and is positionally configured to interface with the first electrically conductive spacer between the first magnet and the second magnet. The antenna structure is electrically coupled with the first electrically conductive spacer. The wireless communication circuitry is electrically coupled with the second electrically conductive spacer.

In another example of the electronic communication device, the first magnet includes a first group of two or more magnets that together define a first gap therebetween through which a first electrical connector connecting the antenna structure to the first electrically conductive spacer passes. The second magnet includes a second group of two or more magnets that together define a second gap therebetween through which a second electrical connector connecting the wireless communication circuitry to the second electrically conductive spacer passes.

In another example of the electronic communication device, one or more of the first connector and the second connector includes a respective connector magnet. A respective guide magnet is positioned adjacent to the one or more of the first connector and the second connector having the respective connector magnet. A polarity of the respective guide magnet is aligned with a polarity of the respective connector magnet such that the respective guide magnet guides the respective connector magnet into a connection position by repulsive magnetic force. The addition of the guide magnets provides the technical benefit of additional alignment force in addition to the continuous mutual attractive force to maintain reliable and consistent alignment and contact between the connectors, thereby better maintaining electrical contact. As a result, antenna performance (i.e., efficiency, gain, bandwidth) may be improved and maintained over the lifetime of the electronic communication device.

In another example of the electronic communication device, the respective guide magnet comprises a two or more magnets that together surround a perimeter of the respective connector magnet.

An example method for connecting antenna structures to wireless communication circuitry in electronic communication devices includes the following operations. An antenna structure configured to communicate wireless radiofrequency signals is mounted on a first component support structure. A first connector is attached to the antenna structure. Wireless communication circuitry configured to communicate using radiofrequency carrier signals is mounted on a second component support structure mechanically coupled to the first component support structure and capable of movement with respect to the first component support structure. A second connector is attached to the wireless communication circuitry. The first connector is mechanically connected to and resiliently aligned with the second connector by mutual magnetic attraction therebetween and such that the first connector and the second connector are communicatively coupled to communicate the radiofrequency carrier signal between the wireless communication circuitry and the antenna structure.

In another example method, one or more of the first connector and the second connector is formed by coating a respective magnet with conductive material.

In another example method, a spacer is interposed between the first connector and the second connector. A capacitor is positioned within the spacer. A first lead of the capacitor is the first connector. A second lead of the capacitor is electrically connected to the second connector.

In another example method, the first connector is formed by winding a first conductor around a first magnet. The second connector is formed by winding a second conductor around a second magnet. A spacer is interposed between the first connector and the second connector. A lead of the first conductor to the antenna structure. A lead of the second conductor is electrically connected to the wireless communication circuitry.

In another example method, one of the first connector and the second connector is formed by coating a magnet with an electrically conductive material to form a coated magnet. One of the first connector and the second connector is formed to include an uncoated magnet. An electrically conductive spacer is attached to the uncoated magnet such that the electrically conductive spacer is positionally configured to interface between the coated magnet and the uncoated magnet. The antenna structure is electrically coupled to the electrically conductive spacer and the wireless communication circuitry through the first connector and the second connector.

In another example method, the first connector is formed to include a first magnet. The second connector is formed to include a second magnet. A first electrically conductive spacer is attached to the first magnet such that the first electrically conductive spacer is positionally configured to interface between the first magnet and the second magnet. The antenna structure to the first electrically conductive spacer. A second electrically conductive spacer is attached to the second magnet such that the second electrically conductive spacer is positionally configured to interface with the first electrically conductive spacer between the first magnet and the second magnet. The wireless communication circuitry is communicatively coupled to the second electrically conductive spacer.

In another example method, one or more of the first connector and the second connector is formed to include a respective connector magnet. A respective guide magnet is positioned adjacent to one or more of the first connector and the second connector having the respective connector magnet. A polarity of the respective guide magnet is aligned with a polarity of the respective connector magnet such that the respective guide magnet guides the respective connector magnet into a connection position by repulsive magnetic force.

In an example method for communicating radiofrequency carrier signals in wireless electronic communication devices, operations include the following. A radiofrequency carrier signal is received at an antenna structure mounted on a first component support structure. The radiofrequency carrier signal is transmitted to a first connector communicatively coupled to the antenna structure. The radiofrequency carrier signal is communicated to a second connector mechanically connected to the first connector by mutual magnetic attraction therebetween. The radiofrequency carrier signal is communicated to wireless communication circuitry configured to communicate using radiofrequency carrier signals. The wireless communication circuitry is mounted on a second component support structure mechanically coupled to the first component support structure and capable of movement with respect to the first component support structure. The first connector and the second connector maintain resilient alignment with each other due to the mutual magnetic attraction.

In another example method, an outgoing radiofrequency carrier signal is generated at the wireless communication circuitry. The outgoing radiofrequency carrier signal from the wireless communication circuitry is transmitted to the antenna structure through the first connector and the second connector.

While this specification contains many specific implementation details, these should not be construed as limitations on the scope of any technologies or of what may be claimed, but rather as descriptions of features specific to particular implementations of the particular described technology. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

The logical operations making up implementations of the technology described herein may be referred to variously as operations, steps, objects, or modules. Furthermore, it should be understood that logical operations may be performed in any order, adding or omitting operations as desired, regardless of whether operations are labeled or identified as optional, unless explicitly claimed otherwise or a specific order is inherently necessitated by the claim language. Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. Moreover, the separation of various system components in the implementations described above should not be understood as requiring such separation in all implementations.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the structures disclosed herein, and do not create limitations, particularly as to the position, orientation, or use of such structures. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

The above specification, examples and data provide a thorough description of the structure and use of exemplary embodiments of the invention as defined in the claims. Although various embodiments of the claimed invention have been described above with a certain degree of particularity, or with reference to one or more individual embodiments, other embodiments using different combinations of elements and structures disclosed herein are contemplated, as other iterations can be determined through ordinary skill based upon the teachings of the present disclosure. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:
1. An electronic communication device comprising:
a first component support structure;
an antenna structure mounted on the first component support structure and configured to communicate wireless radiofrequency signals;
a first connector connected to the antenna structure;

a second component support structure mechanically coupled to the first component support structure and capable of movement with respect to the first component support structure;

wireless communication circuitry mounted on the second component support structure configured to communicate with the antenna structure using radiofrequency carrier signals; and a second connector connected to the wireless communication circuitry, wherein the first connector and the second connector are mechanically connected and resiliently aligned by magnetic attraction therebetween and are communicatively coupled to communicate the radiofrequency carrier signals between the wireless communication circuitry and the antenna structure, wherein the magnetic attraction and communicative coupling between the first connector and the second connector are at least partially coincident.

2. The electronic communication device of claim 1, wherein one or more of the first connector and the second connector includes a respective magnet coated with electrically conductive material.

3. The electronic communication device of claim 1 further comprising:

a spacer interposed between the first connector and the second connector; and a capacitor positioned within the spacer; wherein a first lead of the capacitor is electrically connected to the first connector; and a second lead of the capacitor is electrically connected to the second connector.

4. The electronic communication device of claim 2 further comprising a spacer interposed between the first connector and the second connector; and a capacitor positioned within the spacer; wherein a first lead of the capacitor is electrically connected to the first connector; and a second lead of the capacitor is electrically connected to the second connector.

5. The electronic communication device of claim 1, wherein the first connector includes a first magnet;

the second connector includes a second magnet; and the electronic communication device further comprises:

a spacer interposed between the first connector and the second connector;

a first conductor winding in the first connector, wherein the first conductor winding is wrapped around the first magnet and includes a first lead that is electrically coupled to the antenna structure; and a second conductor winding in the second connector, wherein the second conductor winding is wrapped around the second magnet and includes a second lead that is electrically coupled to the wireless communication circuitry.

6. The electronic communication device of claim 1, wherein one of first connector and the second connector includes a coated magnet covered with electrically conductive material; and one of the first connector and the second connector includes an uncoated magnet that is not covered with electrically conductive material, and further comprising:

an electrically conductive spacer attached to the uncoated magnet, wherein the electrically conductive spacer is positionally configured to interface between the coated magnet and the uncoated magnet; and the antenna structure is electrically coupled to the electrically conductive spacer and the wireless communication circuitry through the first connector and the second connector.

7. The electronic communication device of claim 6, wherein the uncoated magnet comprises two or more magnets that together define a gap through which an electrical connector connecting either the antenna structure or the wireless communication circuitry to the electrically conductive spacer passes.

8. The electronic communication device of claim 1, wherein the first connector includes a first magnet;

the second connector includes a second magnet; and the electronic communication device further comprises:

a first electrically conductive spacer attached to the first magnet such that the first electrically conductive spacer is positionally configured to interface between the first magnet and the second magnet; and a second electrically conductive spacer attached to the second magnet such that the second electrically conductive spacer is positionally configured to interface with the first electrically conductive spacer between the first magnet and the second magnet, wherein the antenna structure is electrically coupled with the first electrically conductive spacer; and the wireless communication circuitry is electrically coupled with the second electrically conductive spacer.

9. The electronic communication device of claim 8, wherein the first magnet includes a first group of two or more magnets that together define a first gap therebetween through which a first electrical connector connecting the antenna structure to the first electrically conductive spacer passes; and the second magnet includes a second group of two or more magnets that together define a second gap therebetween through which a second electrical connector connecting the wireless communication circuitry to the second electrically conductive spacer passes.

10. The electronic communication device of claim 1, wherein one or more of the first connector and the second connector includes a respective connector magnet, and further comprising:

a respective guide magnet positioned adjacent to the one or more of the first connector and the second connector having the respective connector magnet, wherein a polarity of the respective guide magnet is aligned with a polarity of the respective connector magnet such that the respective guide magnet guides the respective connector magnet into a connection position by repulsive magnetic force.

11. The electronic communication device of claim 10, wherein the respective guide magnet comprises a two or more magnets that together surround a perimeter of the respective connector magnet.

12. A method for connecting antenna structures to wireless communication circuitry in electronic communication devices, the method comprising:

mounting an antenna structure configured to communicate wireless radiofrequency signals on a first component support structure;

attaching a first connector to the antenna structure;

mounting wireless communication circuitry configured to communicate using radiofrequency carrier signals on a second component support structure mechanically coupled to the first component support structure and capable of movement with respect to the first component support structure;

attaching a second connector to the wireless communication circuitry; and mechanically connecting and resiliently aligning the first connector with the second connector by mutual magnetic attraction therebetween and such that the first connector and the second connector are communicatively coupled to communicate the radiofrequency carrier signals between the wireless communication circuitry and the antenna structure, wherein the magnetic attraction and communicative coupling between the first connector and the second connector are at least partially coincident.

13. The method of claim 12 further comprising:

forming one or more of the first connector and the second connector by coating a respective magnet with conductive material.

14. The method of claim 12 further comprising:

interposing a spacer between the first connector and the second connector;

positioning a capacitor within the spacer;

electrically connecting a first lead of the capacitor to the first connector; and electrically connecting a second lead of the capacitor to the second connector.

15. The method of claim 12 further comprising:

forming the first connector by winding a first conductor around a first magnet;

forming the second connector by winding a second conductor around a second magnet;

interposing a spacer between the first connector and the second connector;

electrically connecting a lead of the first conductor to the antenna structure; and electrically connecting a lead of the second conductor to the wireless communication circuitry.

16. The method of claim 12 further comprising:

forming one of the first connector and the second connector by coating a magnet with an electrically conductive material to form a coated magnet;

forming one of the first connector and the second connector to include an uncoated magnet;

attaching an electrically conductive spacer to the uncoated magnet such that the electrically conductive spacer is positionally configured to interface between the coated magnet and the uncoated magnet; and electrically coupling the antenna structure to the electrically conductive spacer and the wireless communication circuitry through the first connector and the second connector.

17. The method of claim 12 further comprising:

forming the first connector to include a first magnet;

forming the second connector to include a second magnet;

attaching a first electrically conductive spacer to the first magnet such that the first electrically conductive spacer is positionally configured to interface between the first magnet and the second magnet;

communicatively coupling the antenna structure to the first electrically conductive spacer;

attaching a second electrically conductive spacer to the second magnet such that the second electrically conductive spacer is positionally configured to interface with the first electrically conductive spacer between the first magnet and the second magnet; and communicatively coupling the wireless communication circuitry to the second electrically conductive spacer.

18. The method of claim 12 further comprising:

forming one or more of the first connector and the second connector to include a respective connector magnet; and positioning a respective guide magnet adjacent to one or more of the first connector and the second connector having the respective connector magnet, wherein a polarity of the respective guide magnet is aligned with a polarity of the respective connector magnet such that the respective guide magnet guides the respective connector magnet into a connection position by repulsive magnetic force.

19. A method for communicating radiofrequency carrier signals in wireless electronic communication devices, the method comprising:

receiving a radiofrequency carrier signal at an antenna structure mounted on a first component support structure;

transmitting the radiofrequency carrier signal to a first connector communicatively coupled to the antenna structure;

communicating the radiofrequency carrier signal to a second connector mechanically connected to the first connector by mutual magnetic attraction therebetween; and communicating the radiofrequency carrier signal to wireless communication circuitry configured to communicate using radiofrequency carrier signals, wherein the wireless communication circuitry is mounted on a second component support structure mechanically coupled to the first component support structure and capable of movement with respect to the first component support structure, and the first connector and the second connector maintain resilient alignment with each other due to the mutual magnetic attraction, wherein the mutual magnetic attraction and communicative coupling between the first connector and the second connector are at least partially coincident.

20. The method of claim 19 further comprising:

generating an outgoing radiofrequency carrier signal at the wireless communication circuitry; and transmitting the outgoing radiofrequency carrier signal from the wireless communication circuitry to the antenna structure through the first connector and the second connector.

* * * * *